(12) United States Patent
Ishida (10) Patent No.: US 6,178,017 B1
(45) Date of Patent: Jan. 23, 2001

(54) IMAGE FORMING APPARATUS (75) Inventor: Yasushi Ishida, Moriya-machi (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 09/100,141

(22) Filed: Jun. 19, 1998

(30) Foreign Application Priority Data

Jun. 25, 1997 (JP) .................................... 9-168695

(51) Int. Cl.$^7$ ..................................... H04N 1/04
(52) U.S. Cl. ............................. 358/498; 358/496
(58) Field of Search .................... 358/496, 498, 358/401, 501; 399/1, 377, 405; 355/75

(56) References Cited

U.S. PATENT DOCUMENTS 5,732,321   3/1998   Ishizuka et al. ................ 399/391

FOREIGN PATENT DOCUMENTS

| 0 679 965 | 11/1995 | (EP) . |
| 0 795 801 | 9/1997 | (EP) . |
| 2-264559 | 10/1990 | (JP) . |
| 7-304548 | 11/1995 | (JP) . |
| 8-018742 | 1/1996 | (JP) . |
| 8-204895 | 8/1996 | (JP) . |
| 9-319176 | 12/1997 | (JP) . |

*Primary Examiner*—Cheukfan Lee
(74) *Attorney, Agent, or Firm*—Fitzpatrick, Cella, Harper & Scinto (57) ABSTRACT An image forming apparatus has an image forming unit disposed within a main body and adapted to form an image on a recoding sheet, a recording sheet supply device for supplying the recording sheet to the image forming units, a stacking portion on which recorded recording sheets are discharged and stacked, an image reading unit for reading an original sheet, and an original supply device for supplying the original sheet to the image reading unit. The stacking portion for the recording sheets intersects with a supply path for the original sheet.

14 Claims, 7 Drawing Sheets

IMAGE FORMING APPARATUS

BACKGROUND OF THE INVENTION

1. Field of the Invention

The present invention relates to an image forming apparatus such as a facsimile, a copying machine and the like, having an improved sheet convey path.

2. Related Background Art

Figure 7:
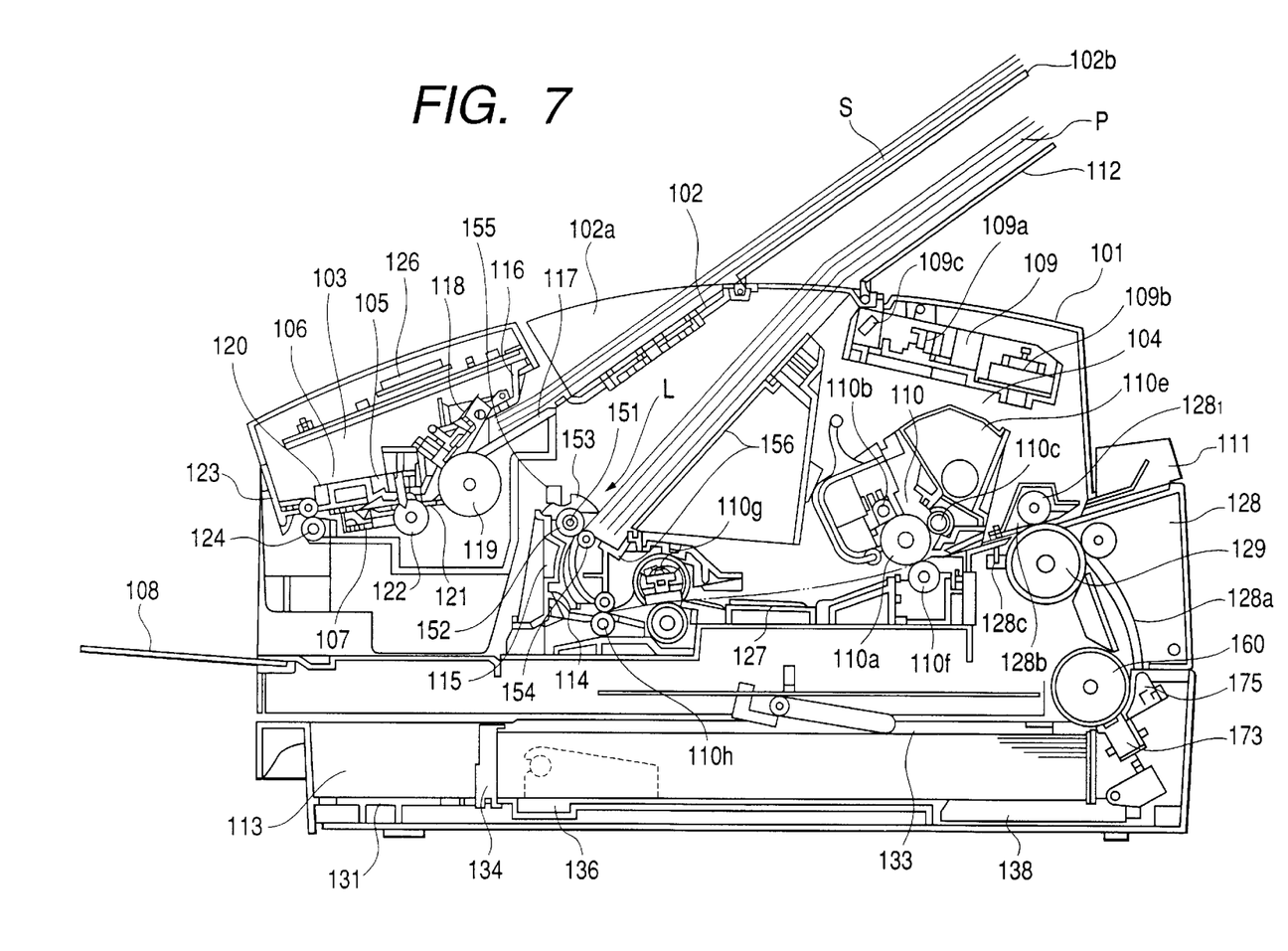
FIG. 7 is an elevational sectional view of a conventional facsimile apparatus.

As an example of a conventional image forming apparatus, a facsimile apparatus will be described with reference to FIG. 7. FIG. 7 shows a facsimile apparatus as an image forming apparatus in which a sheet conveying apparatus L is used in a sheet discharge portion (discharge portion) for discharging a sheet.

In FIG. 7, the facsimile apparatus comprises a main body or frame 101, a cartridge cover 102 also acting as an original stacking plate on which a plurality of originals S can be stacked, an image reading portion 103 for reading image information on the original S, a recording device (laser beam printer) 104, an original convey portion 105, an original urging portion 106, an image sensor 107 of contact type, an original discharge tray 108, a laser scanner 109, an image forming portion (image forming means) 110, a manual insertion sheet supply portion 111, a face-down recording sheet discharge tray 112 including a sheet discharge tray 156 of the sheet conveying apparatus L, a cassette portion 113, a recording sheet convey path switching flapper 114, a face-down guide 115, an upper original guide 116, a lower original guide 117, an operation portion 125, a display portion 126, a convey guide 127, a rear cover 128, and a convey roller 129.

In the image reading portion 103, first of all, the originals (sheets) S stacked on the original stacking plate 102 are separated and supplied one by one by a friction piece 118 and a separation roller 119 urged against the friction piece, and, then, the separated original is conveyed to the image sensor 107 of contact type by means of a sheet supply sub-roller 121 urged by an urging spring 120 and a sheet supply roller 122 urged against the sheet supply sub-roller 121, and, then, the original is urged against the image sensor 107 of contact type in the original urging portion 106, so that the image information on the original S is read by the image sensor 107 of contact type. Thereafter, the original S is discharged onto the original discharge tray 108 by means of a sheet discharge sub-roller 123 urged by the urging spring 120 and a sheet discharge roller 124 urged against the sheet discharge sub-roller 123. Meanwhile, the original S is guided by the upper and lower original guides 116, 117.

The original stacking plate 102 is provided with a slider 102a slidable in a direction (original width-wise direction) perpendicular to a conveying direction of the original S. Both lateral edges of the originals S stacked on the original stacking plate 102 can be aligned with each other by the slider 102a. When the original S is elongated, rear parts of the originals S can be prevented from protruding from and being suspended from the original stacking plate 102 by means of an original tray 102b.

In the recording device 104, a modulated signal (modulated beam) is emitted from a laser beam generating device 109a of the laser scanner 109 in response to an image signal outputted from a control portion, and the modulated beam is illuminated (as a scan beam) onto a photosensitive drum 110a of the image forming portion 110 through a polygon mirror 109b, thereby forming the image information on the photosensitive drum 110a. After the image information is transferred onto and fixed to a recording paper sheet (sheet) P supplied from the manual insertion sheet supply portion 111 or the cassette portion 113 to the image forming portion 110, the recording sheet P is discharged onto the recording sheet stacking tray 112.

The photosensitive drum 110a is integrally incorporated into a recording cartridge 110e (which is detachably mounted on the main body 101) together with a first charger 110b, a developing roller 110c and a cleaning blade (not shown). A surface of the photosensitive drum 110a is uniformly charged by the first charger 110b. When the scan beam sent from the polygon mirror 109b is illuminated onto the charged surface of the photosensitive drum through a reflection mirror 109c, a latent image is formed on the photosensitive drum. The latent image is visualized as a toner image by toner supplied from the developing roller 110c.

A transfer charger 110f is disposed around the photosensitive drum 110a of the image forming portion 110. Further, in a recording sheet convey path at a downstream side of the photosensitive drum 110a, there are disposed a thermal fixing device 110g, a pair of discharge rollers 110h, and a rubber roller 152 and a pinch roller 154 (constituting a pair of face-down sheet discharge rollers of the sheet conveying apparatus L).

After the toner image formed on the surface of the photosensitive drum 110a is transferred to the recording sheet P by the transfer charger 110f, the recording sheet is conveyed, along the convey guide 127, to the thermal fixing device 110g, where the toner image is fixed to the recording sheet. Thereafter, the recording sheet is sent to the pair of discharge rollers 110h. An operator can select one of two recording sheet output modes (so-called "face-down discharge mode" and "face-up discharge mode"). The face-down discharge mode means a mode in which the recording sheets are discharged with imaged surfaces thereof facing downwardly in a page order or sequence, and the face-up discharge mode means a mode in which the recording sheets are discharged with imaged surfaces thereof facing upwardly so that the outputted contents can be observed or ascertained during the discharging operation. The modes can be switched by switching the convey path by shifting the recording sheet convey path switching flapper 114.

FIG. 7 shows a condition that the apparatus is in the face-down discharge mode. In this condition, the recording sheet P directed upwardly by the flapper 114 is guided along the face-down guide 115 and then is discharged onto the face-down recording sheet discharge tray 112 by the rubber roller 152 and the pinch roller 154 (constituting the pair of face-down sheet discharge rollers).

When the operator selects the face-up discharge mode, the flapper 114 is switched by a switching lever (not shown) so that the original is discharged toward the original discharge tray 108. The original discharge tray 108 also acting as the face-up discharge tray is formed from metal wires so that the operator does almost not feel the fact that any obstacle exists at a front side of the apparatus even when the operator stands at the front side of the apparatus.

The cassette portion 113 is disposed at a bottom of the main body 101. A recording sheet stack P contained in a cassette container 131 is urged against separation roller 160 by rotating an intermediate plate 136 upwardly by means of a lifter arm (supplying force providing means) 138 so that the recording sheets P can be separated one by one by a separation pad 173 (friction piece separating system). The separated recording sheet is conveyed along a separation guide 175 and is reversely rotated by the convey roller 129, a cover side U-turn guide 128a provided on the rear cover 128 and a main body side U-turn guide 128b provided on the main body 101.

During the supplying operation, a tip end of the recording sheet P is detected by a regist sensor 128c. After a sheet supplying timing and an image outputting timing are adjusted so that a tip end of the toner image formed on the photosensitive drum 110a is aligned with the tip end of the recording sheet P, the recording sheet is conveyed to a nip between the transfer charger 110f and the photosensitive drum 110a. The image is recorded on a surface of the recording sheet which is a lower surface when the sheet is in the cassette portion 113.

Lateral edges and rear edges of the recording sheets P are regulated by a width regulating plate 133 and a rear end regulating plate 134 which can be shifted in accordance with the size of the recording sheet, thereby preventing skew-feed and poor conveyance of the recording sheet. The stackable number of recording sheets is about 250 (sheets) and the cassette portion can be retracted toward the front side of the apparatus (front loading type). Three kinds of sheet having A4 size, LTR size and Regal size can be used with this apparatus. Incidentally, in FIG. 7, the rear end regulating plate 134 is set at a position corresponding to the LTR size sheet.

The manual insertion sheet supply portion 111 is disposed on the rear cover 128. A recording sheet P inserted into the manual insertion sheet supply portion 111 is sent to the image forming portion 110 by the convey roller 129 and a sub-roller $128_1$ provided on the U-turn guide 128b. The main body 101 is provided with the open/close cartridge cover 102. When the cartridge cover 102 is opened, the recording cartridge 110e can be replaced by a new one.

In the illustrated facsimile apparatus, the cartridge cover 102 is provided with an interlock mechanism so that the recording device 104 cannot be operated if the cartridge cover 102 is opened or if the recording cartridge 110e is not mounted within the main body 101.

A drum exposure preventing shutter (not shown) of the recording cartridge 110e is operated in synchronous with the setting of the recording cartridge 110e with respect to the main body 101. That is to say, the shutter is opened when the cartridge cover 102 is opened and the recording cartridge 110e is mounted within the main body 101; whereas, the shutter is closed when the recording cartridge 110e is dismounted from the main body 101 so that unwanted exposure of the photosensitive drum 110a is prevented.

During the recording operation, if the sheet is jammed, the recording sheet P jammed with the main body 101 can be removed by opening the cartridge cover 102, rear cover 128, face-down guide 115 or cassette portion 113. In the image sensor 107 of contact type, light from an LED array (light source) is illuminated onto the imaged surface of the original S, and light reflected from the imaged surface is focussed on a sensor element through a SELFOC (trade mark) lens, thereby reading the image information.

As indicated above, in the conventional image forming apparatus, there has been proposed the reading system arranged at the front side (left side in FIG. 7) of the recording system.

However, in the above-mentioned conventional example, since the originals passed through the reading portion are stacked on the tray protruding from the apparatus, a space must be reserved at the front side of the apparatus. Further, if the discharged originals are left as they are, since it is difficult to access to the operation portion the operability will be worsened.

If the tray is removed, although the apparatus becomes compact, good arrangement of the discharged originals cannot be ensured, and, thus, the page sequence may be disordered. Further, regarding the apparatus shown in FIG. 7, in the face-up discharge mode, since both the originals and the recording sheets are stacked on the tray, the originals and the recording sheets may be mixed.

SUMMARY OF THE INVENTION

The present invention aims to eliminate the above-mentioned conventional drawbacks, and an object of the present invention is to provide an image forming apparatus in which operability can be improved without increasing a size of an apparatus itself and a required space.

The first invention is related to an image forming apparatus, and featured by that an image forming means disposed within a main body and adapted to form an image on a recording sheet; a recording sheet supply means for supplying the recording sheet to the image forming means; a stacking portion on which recorded recording sheets are discharged and stacked; an image reading means for reading an original sheet; and an original supply means for supplying the original sheet to the image reading means;

wherein the stacking portion for the recording sheets intersects with a supply path for the original sheet.

The second invention is featured by that a recording sheet stacking means for stacking recording sheets on which images are not yet formed is disposed at a rear part of the main body and a recording sheet stacking means of the stacking portion is disposed at a front part of the main body, and the image forming means is disposed between the recording sheet stacking means and the image reading means is disposed above the image forming means.

The third invention is featured by that, further comprising an original sheet tray which can be rocked around a rotary shaft extending in a direction perpendicular to an original sheet supplying direction and which can be retracted forwardly of the main body in a used condition and be returned above the image reading means in a non-used condition, and wherein the original sheet tray intersects with the stacking portion.

The fourth invention is featured by that the original sheet tray can be folded.

The fifth invention is featured by that the original sheet tray is provided with an open/close cover disposed at the intersection and permits passage of the recording sheet on which the image was formed in a condition that the original sheet tray is retracted forwardly of the main body during an original reading operation.

The sixth invention is featured by that the open/close cover is rotated by a drive means for the image reading means, and a rotational direction of the drive means is opposite to a rotational direction thereof during the original reading operation.

The seventh invention is featured by that the image forming means includes an electrophotographic photosensitive member, an exposure means for forming a latent image on the photosensitive member, a developing means for developing the latent image to form a developed image, a transfer means for transferring the developed image onto the sheet, and a fixing means for fixing the transferred image to the sheet.

The eighth invention is featured by that further comprising a sheet separation and supply means disposed between a lower part of the recording sheet stacking means and the image forming means, and a recording sheet guide disposed at a downstream side of the image forming means in a sheet conveying direction.

The ninth invention is featured by that the recording sheet guide is provided with a switch means for selectively switching a discharge path of the guide to direct the recording sheet to the recording sheet stacking means or toward a front side of the main body.

The tenth invention is featured by that the image reading means includes a supply means for supplying the original sheet, and an image sensor for reading information on the supplied original sheet.

The eleventh invention is featured by that further comprising an original stacking means disposed at a downstream side of the image reading means and adapted to stack the original sheets.

The twelfth invention is featured by that further comprising an operation portion for image formation disposed above the image reading means.

The thirteenth invention is featured by that wherein the recording sheet stacking means of the stacking portion can be opened and closed, and, when the recording sheet stacking means is opened, the image forming means can be removed.

The fourteenth invention is featured by that, when the image forming means is removed, the sheet convey path is exposed.

According to the present invention, the size of the apparatus can be reduced by intersecting the discharge path for the recording sheet (on which the image was formed) with the discharge path for the supply path for the original sheet.

Further, since the original sheet tray for supplying the original sheet to the original reading means can be folded, the size of the apparatus can be further reduced, and the operation portion at the upper part of the original reading means can be covered by the original sheet tray, with the result that, when the apparatus is used as the printer, since the unused buttons of the operation portion are concealed by the tray, operability is improved.

By providing the open/close cover in the original sheet tray, even when the original sheet tray is opened, the face-down discharge can be effected, thereby increasing the operator's selection range. Further, when the original sheets are rested on the original sheet tray, by effecting the face-up discharge by switching the recording sheet discharge path, the sheets can be outputted quickly.

DETAILED DESCRIPTION OF THE PREFERRED EMBODIMENTS

[First Embodiment]

The present invention will now be explained in connection with a preferred embodiment thereof with reference to the accompanying drawings.

Figure 1:
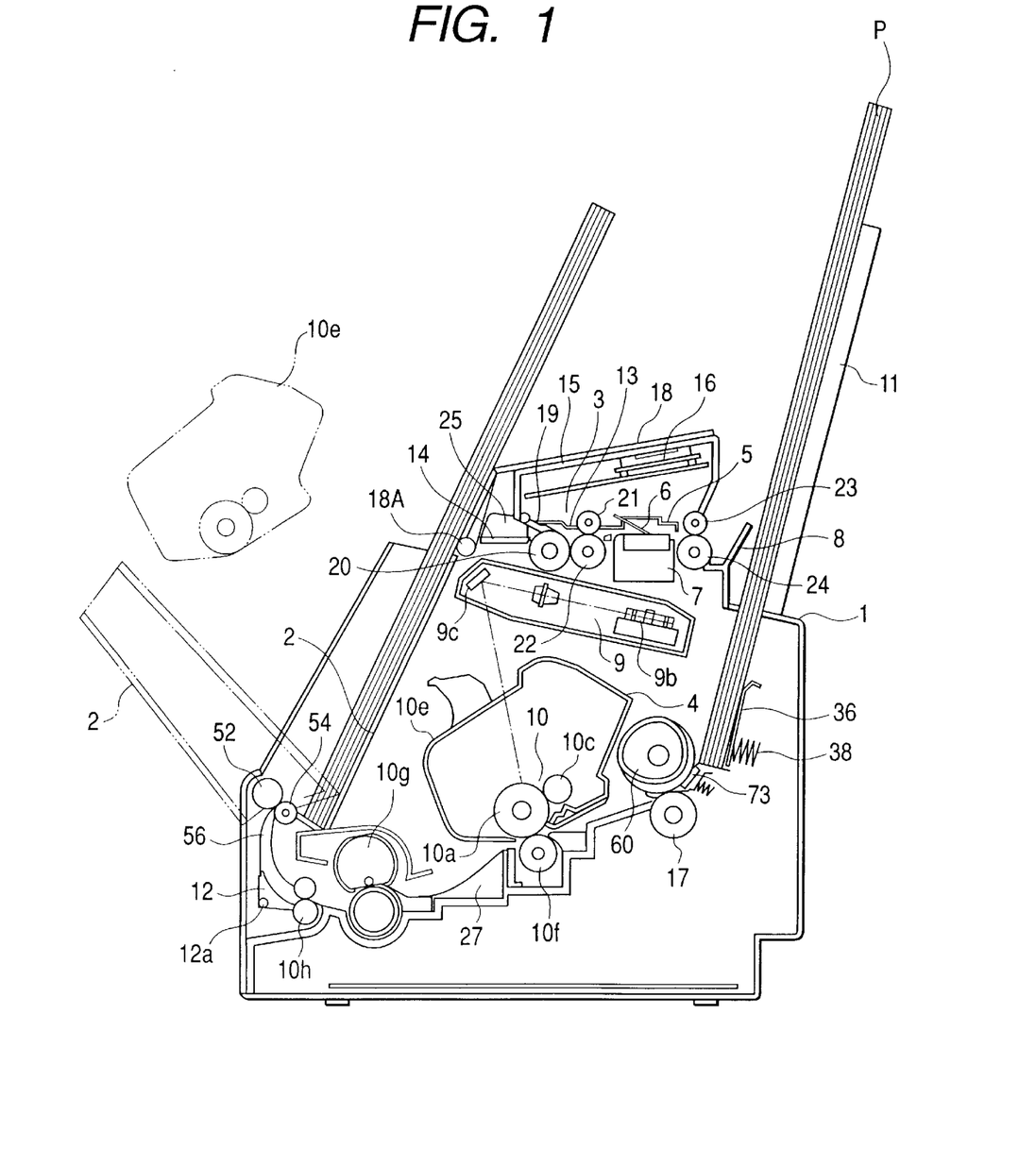
FIG. 1 is a sectional view of an image forming apparatus according to a preferred embodiment of the present invention.
Figure 2:
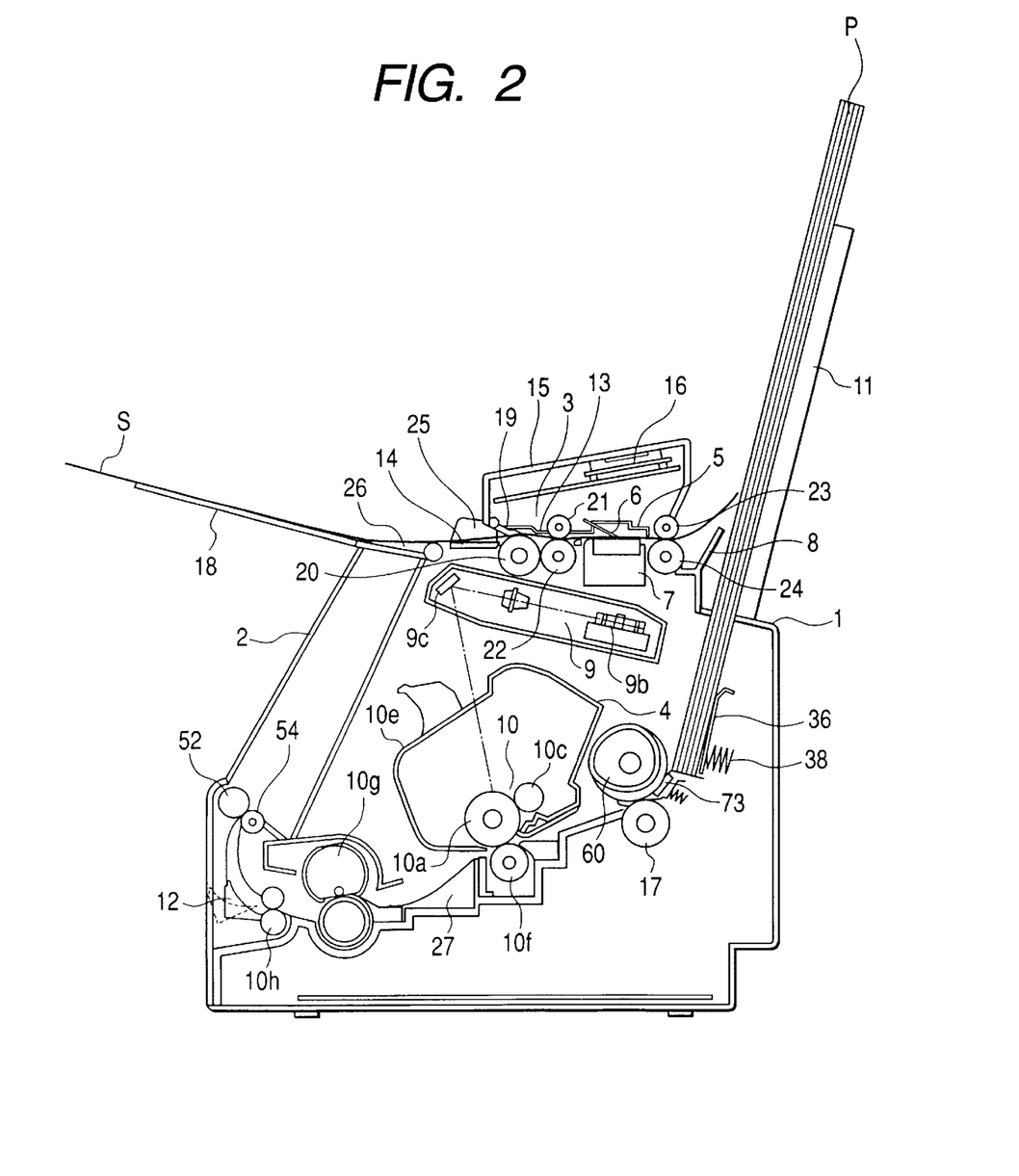
FIGS. 2 and 3 are explanatory views for explaining sheet conveyance in the image forming apparatus according to the preferred embodiment.
Figure 3:
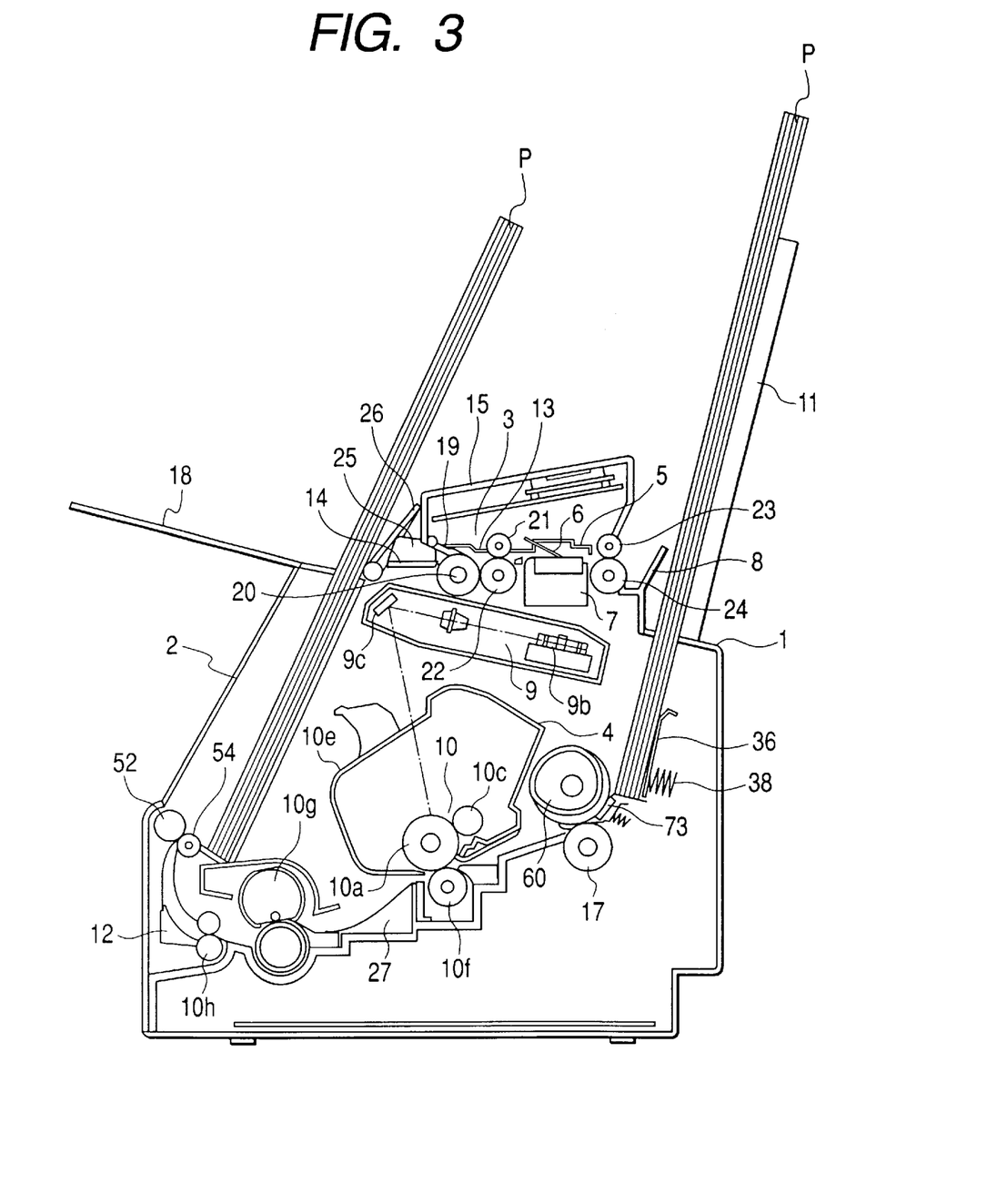

FIGS. 1 to 3 show a facsimile apparatus as a sheet conveying apparatus according to the present invention.

In FIGS. 1 to 3, the facsimile apparatus comprises a main body or frame 1, a cartridge cover 2 also acting as a sheet discharge tray on which a plurality of recording sheets can be stacked in a face-down fashion, an image reading portion 3 for reading image information on an original S, a recording device (laser beam printer) 4, an original convey portion 5, an original urging portion 6, an image sensor 7 of contact type, an original discharge guide 8, a laser scanner 9, an image forming portion (image forming means) 10, a recording sheet supply portion 11, a recording sheet convey path switching flapper 12 rockable around a shaft 12a, an upper original guide 13, a lower original guide 14, an operation portion 15, a display portion 16, and a convey roller 17.

In the image reading portion 3, first of all, the originals (sheets) S stacked on a foldable original stacking plate 18 are separated and supplied one by one by a friction piece 19 and a separation roller 20 urged against the friction piece, and, then, the separated original is conveyed to the image sensor 7 of contact type by means of a sheet supply sub-roller 21 urged by an urging spring and a sheet supply roller 22 urged against the sheet supply sub-roller 21. The original is urged against the image sensor 7 of contact type in the original urging portion 6, so that the image information on the original S is read by the image sensor 7 of contact type. Thereafter, the original S is discharged onto the original discharge guide 8 by means of a sheet discharge sub-roller 23 urged by the urging spring and a sheet discharge roller 24 urged against the sheet discharge sub-roller 23. Meanwhile, the original S is guided by the upper and lower original guides 13, 14.

The lower original guide 14 is provided with a slider 25 slidable in a direction (original width-wise direction) perpendicular to a conveying direction of the original S. Both lateral edges of the originals S stacked on the original stacking plate 18 extended toward a front side of the apparatus can be aligned with each other by the slider 25.

In the recording device 4, a modulated signal (modulated beam) is emitted from a laser beam generating device of the laser scanner 9 in response to an image signal outputted from a control portion 301 (refer to FIG. 5), and the modulated beam is illuminated (as a scan beam) onto a photosensitive drum 10a of the image forming portion 10 through a polygon mirror 9b, thereby forming the image information on the photosensitive drum 10a.

A transfer charger 10 f is disposed around the photosensitive drum 10a of the image forming portion 10. Further, in a recording sheet convey path at a downstream side of the photosensitive drum 10a, there are disposed a thermal fixing device 10g, a pair of discharge rollers 10h, and a rubber roller 52 and a pinch roller 54 (constituting a pair of face-down sheet discharge rollers of the sheet conveying apparatus L).

The photosensitive drum 10a is integrally incorporated into a recording cartridge 10e (which is detachably mounted on the main body 1) together with a first charger, a developing roller 10c and a cleaning blade (not shown). A surface of the photosensitive drum 10a is uniformly charged by the first charger. When the scan beam sent from the polygon mirror 9b is illuminated onto the charged surface of the photosensitive drum through a reflection mirror 9c, a latent image is formed on the photosensitive drum. The latent image is visualized as a toner image by toner supplied from the developing roller 10c.

After the toner image formed on the surface of the photosensitive drum 10a is transferred to a recording sheet P by the transfer charger 10f, the recording sheet is conveyed, along the convey guide 27, to the thermal fixing device 10g, where the toner image is fixed to the recording sheet. Thereafter, the recording sheet is sent to the pair of discharge rollers 10h.

An operator can select one of two recording sheet output modes (so-called "face-down discharge mode" and "face-up discharge mode"). The "face-down discharge mode" means a mode in which the recording sheets are discharged with imaged surfaces thereof facing downwardly in a page order or sequence, and the "face-up discharge mode" means a mode in which the recording sheets are discharged with imaged surfaces thereof facing upwardly so that the outputted contents can be observed or ascertained during the discharging operation. The modes can be switched by switching the convey path by shifting the recording sheet convey path switching flapper 12. The flapper 12 is driven by a solenoid and the like, and a sheet discharging direction can be ascertained by a sensor (not shown) for detecting the selected mode.

FIG. 1 shows a condition that the apparatus is in the face-down discharge mode. In this condition, the recording sheet P directed upwardly by the flapper 12 is guided along a face-down guide 56 and then is discharged onto the face-down recording sheet discharge tray 2 by the rubber roller 52 and the pinch roller 54 (constituting the pair of face-down sheet discharge rollers).

When the operator selects the face-up discharge mode, the flapper 12 is rotated in an anti-clockwise direction to change a direction thereof (to a position shown by the two dot and chain line in FIG. 2) by driving the solenoid (not shown) by switching a switch (not shown) so that the sheet is discharged toward a front side of the apparatus without passing through the guide 56. The position of the flapper 12 is monitored by a position sensor (not shown).

As shown in FIG. 1, the original stacking plate 18 is a member fladable around a shaft 18b (FIGS. 4A and 4B) and having a rotation center 18A in front of the lower original guide 14. Normally, the original stacking plate 18 is positioned to cover the operation portion 15 disposed at the top of the apparatus. Thus, the entire apparatus becomes more compact and the space can be saved. Further, when the apparatus is used as the printer, since unused buttons such as a ten-key, a one-touch transmission key and the like of the operation portion 15 are covered by the original stacking plate, the operability can be improved.

When the facsimile transmission is effected, as shown in FIG. 2, the original stacking plate 18 is opened forwardly and the originals S are rested on the original stacking plate.

When the facsimile reception or printer command is received in a condition that the original stacking plate 18 is opened, if the face-down discharge mode is selected, the outlet is blocked to cause the sheet jam. To avoid this, the original stacking plate 18 is provided with a lid 26 (FIG. 4A) rockable around the same rotation center as that of the original stacking plate. The rotation of the lid 26 is effected by a motor $M_1$ for driving the reading portion 3, and a slip clutch mechanism $cl_3$ is positioned within a drive train between the motor and the rotation center (FIG. 4B). The operator can manually open or close the lid 26 appropriately.

Further, there are provided sensors (not shown) for detecting open/close conditions of the original stacking plate 18 and the lid 26, so that the recording operation can be controlled in accordance with the open/close conditions. For example, in the condition that the original stacking plate 18 is closed as shown in FIG. 1, the recorded sheet P can be discharged onto the sheet discharge tray 2 in the face-down discharge fashion.

As shown in FIG. 2, when both the original stacking plate 18 and the lid 26 are opened and the originals S are stacked, since the face-down discharge mode cannot be effected, the solenoid is driven to switch the flapper 12 so that the face-up discharge mode can be effected. The presence/absence of the original S can be detected by an original sensor (DS sensor) (not shown) provided in the reading portion.

Figure 4A:
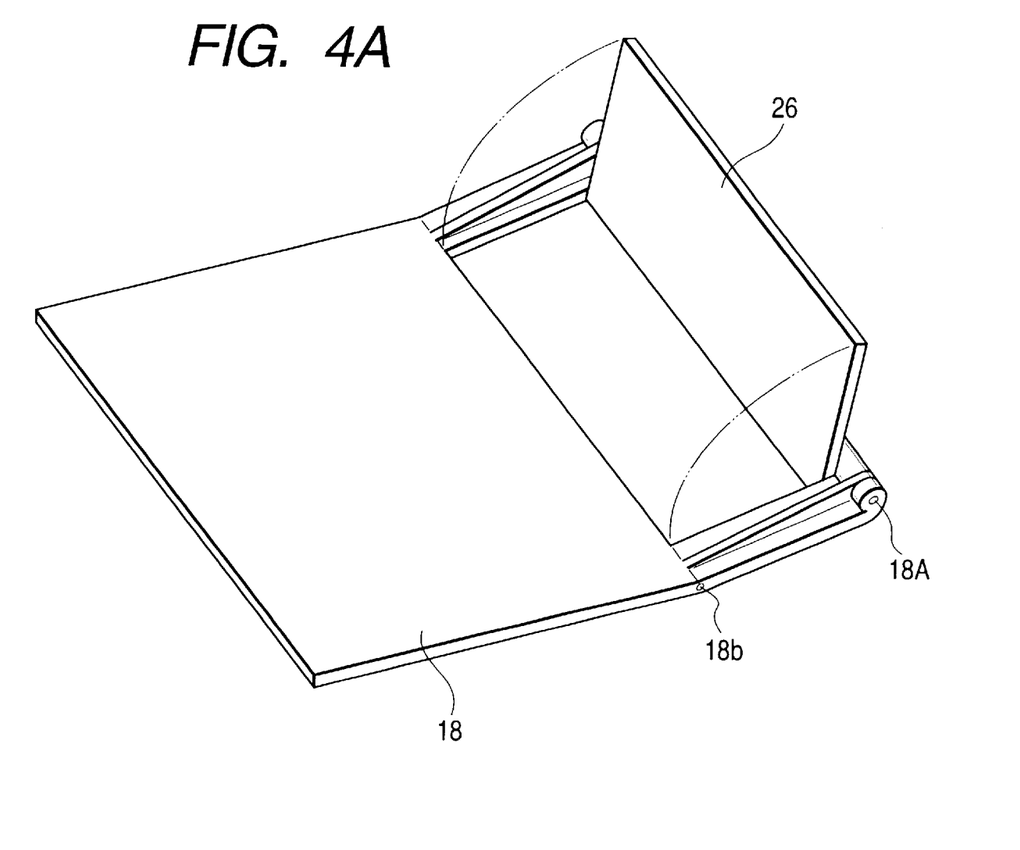
FIG. 4A is a perspective view of an original supply tray of the image forming apparatus according to the preferred embodiment.
Figure 4B:
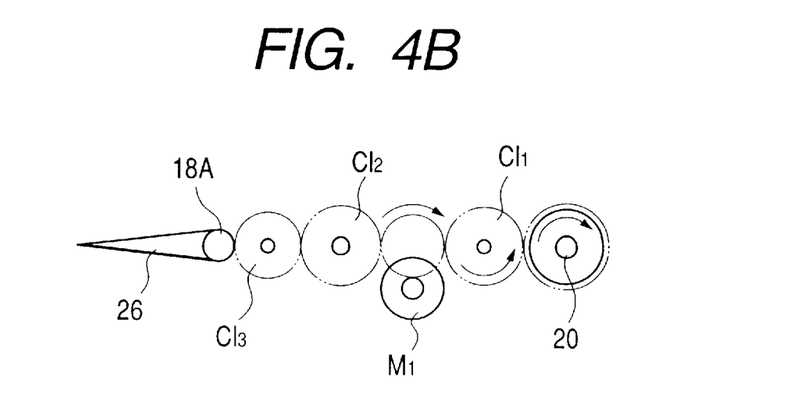
FIG. 4B is a schematic view showing a gear train including clutches.

If there is no original S, the lid 26 is rotated toward the operation portion 15 by rotating the reading motor $M_1$ reversely to define the discharge opening for the sheet P (FIGS. 3 and 4A and 4B). After the fact that the lid 26 is rotated toward the operation portion 15 is detected by the sensor, the recording operation is stared and the face-up discharge is effected. There is provided a one-way clutch $cl_1$ for preventing the roller 20 and the like from rotating when the reading motor $M_1$ is rotated reversely. Due to the presence of a clutch $cl_2$, when the motor is rotated normally, the lid 26 is not operated. After the discharge, if the operator wishes to effect the facsimile transmission, the operator removes the discharged sheets P from the main body and then manually returns the lid 26. Thereafter, the originals S are rested.

In this way, since the recorded sheets are positively removed by the operator, the possibility that the discharged sheets are left as they are is greatly reduced, thereby preventing the delay of information transmission.

In the illustrated embodiment, while an example that the lid 26 is driven by reverse rotation of the reading motor was explained, the lid may be driven by using other means. Further, while an example that the flapper is driven by the solenoid was explained, the present invention is not limited to such an example.

Now, the facsimile apparatus as the sheet conveying apparatus will be explained. Incidentally, since the construction and function of the sheet conveying apparatus L are as mentioned above, detailed explanation thereof will be omitted.

In FIG. 1, a recording sheet stack P contained in the recording sheet supply portion 11 is urged against a separation roller 60 by rotating an intermediate plate 36 by means of an intermediate urging spring 38 so that the recording sheets P can be separated one by one by a separation pad 73 (friction separating system). The separated recording sheet is conveyed by the convey roller 17.

During the supplying operation, a tip end of the recording sheet P is detected by a regist sensor (not shown). After a sheet supplying timing and an image outputting timing are adjusted so that a tip end of the toner image formed on the photosensitive drum 10a is aligned with the tip end of the recording sheet P, the recording sheet is conveyed to a nip between the transfer charger 10f and the photosensitive drum 10a. The image is recorded on a surface of the recording sheet which is an upper surface when the sheet is in the recording sheet supply portion.

Lateral edges and rear edges of the recording sheets P are regulated by sliders (not shown) shiftable in accordance with the size of the recording sheet, thereby preventing skew-feed and poor conveyance of the recording sheet. The stackable number of recording sheets is about 100 (sheets) and the recording sheets are inserted into the main body 1 at a rear side thereof. The main body 1 is provided with the open/ close cartridge cover 2 also acting as the sheet discharge tray. When the cartridge cover 2 is opened, the recording cartridge 10e can be replaced by a new one (two dot and chain line in FIG. 1).

In the facsimile apparatus according to the illustrated embodiment, the cartridge cover 2 is provided with an interlock mechanism so that the recording device 4 cannot be operated if the cartridge cover 2 is opened or if the recording cartridge 10e is not mounted within the main body 1.

A drum exposure preventing shutter (not shown) of the recording cartridge 10e is operated in synchronous with the setting of the recording cartridge 10e with respect to the main body 1. That is to say, the shutter is opened when the cartridge cover 2 is opened and the recording cartridge 10e is mounted within the main body 1; whereas, the shutter is closed when the recording cartridge 10e is dismounted from the main body 1 so that unwanted exposure of the photosensitive drum 10a is prevented.

During the recording operation, if the sheet is jammed, the recording sheet P jammed within the main body 1 can be removed by opening the cartridge cover 2 (FIG. 1). In the image sensor 7 of contact type, light from an LED array (light source) is illuminated onto the imaged surface of the original S, and light reflected from the imaged surface is focussed on a sensor element through a SELFOC (trade mark) lens, thereby reading the image information.

Figure 5:
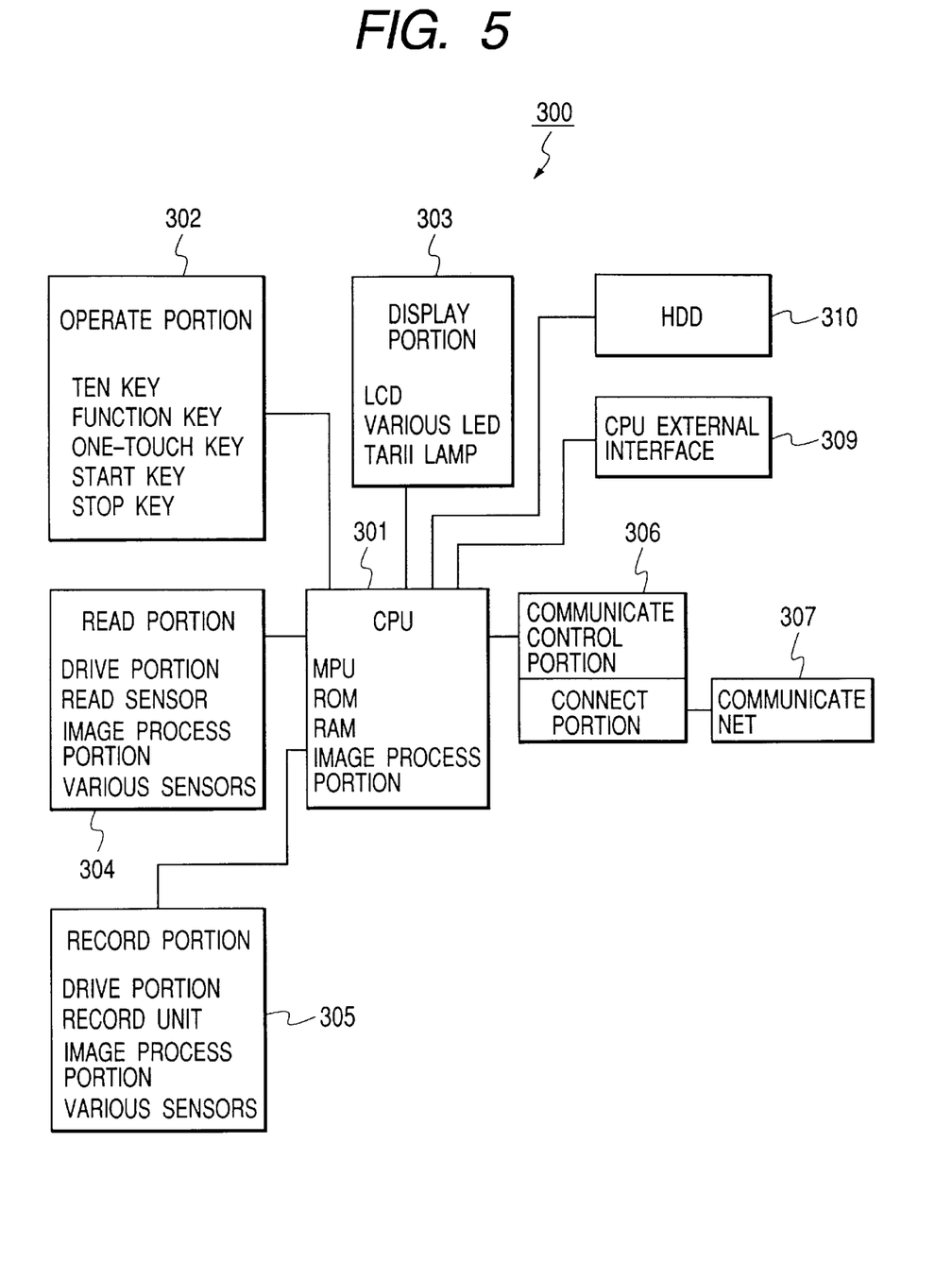
FIG. 5 is a control block diagram of the image forming apparatus according to the preferred embodiment.

FIG. 5 is a block diagram of a control system 300 of the facsimile apparatus using the laser beam printer according to the present invention. In FIG. 5, a CPU 310 for controlling the entire facsimile apparatus includes an MPU, a ROM for storing control program of the MPU, a RAM used as a work area for treating various data and a temporary storing part for storing the image information, and an image processing portion for effecting image magnification change and resolving power conversion.

The CPU 301 also includes a conventional calendar and clock functions, and an area of the RAM in which important system informations such as one-touch key address information and software switch information are stored is backed-up by a battery, thereby protecting from accident such as service interruption. In the control system of the facsimile apparatus, various elements 302 to 310 of the CPU 301 are connected through interfaces.

An operate portion 302 includes various key switches such as a ten-key, function keys, a one-touch key, a start key and a stop key. A display portion 303 includes an LCD for effecting display of various messages, and various LED for effecting display of a transmission mode.

A read portion 304 includes a drive portion for the reading motor, a read sensor for reading the image, an image process portion for effecting shading and two-value setting of the read image, and various sensors for detecting the original. A record portion 305 includes a drive portion for a recording motor, a record unit for controlling the laser scanner and electrophotographic process, an image process portion for smoothing the image to be recorded, and various sensors for detecting the recording sheet.

A communicate control portion 306 for effecting calling, receiving and coding of image data has a connect portion comprised of a MODEM and an NCU, and a communicate net 307 is connected to the connect portion.

A CPU external interface 309 is an interface for effecting direct transmission and reception of data with respect to the CPU 301, and, for example, is connected to a computer externally of the apparatus through a circuit such as RS232C, SCSI, LAN so that the apparatus can be used as a scanner printer for the external computer. An HDD 310 is used as a large capacity non-volatile memory for storing the image information and the like.

Figure 6:
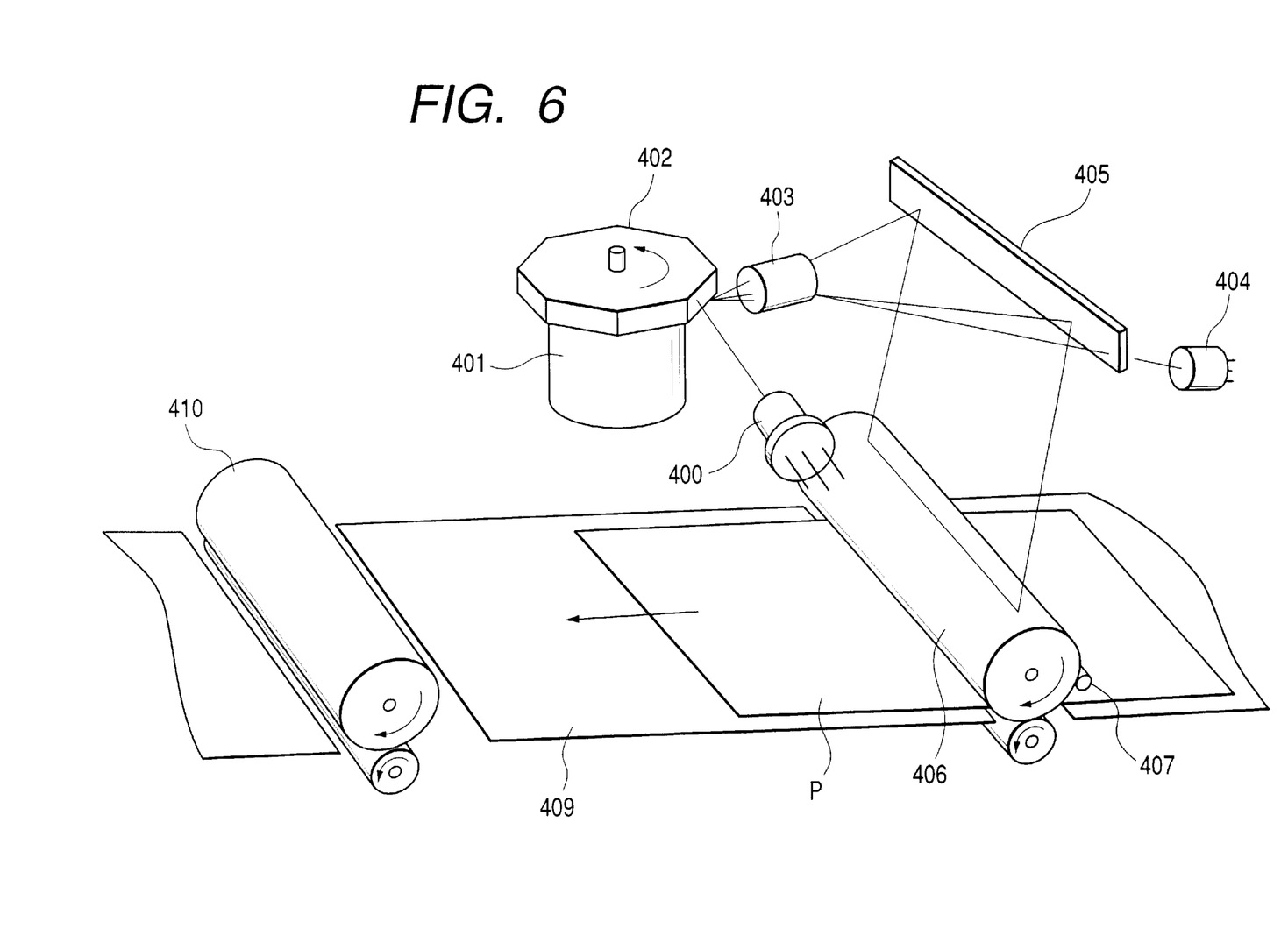
FIG. 6 is a schematic view for explaining a printing operation of the image forming apparatus according to the preferred embodiment.

Next, a fundamental operation of the laser beam printer will be explained with reference to FIG. 6 (conceptional view). In FIG. 6, the reference numeral 400 denotes a semi-conductor laser for flashing a laser beam with respect to the image data to be recorded; 401 denotes a polygon motor; 402 denotes a polygon mirror rotated by the polygon motor 401; 403 denotes an optical system for effecting the focussing of the image and falling correction; 404 denotes a photo-detector; 405 denotes a reflection mirror; 406 denotes a photosensitive drum; 407 denotes a developing device; P denotes a recording sheet; 409 denotes a convey guide; and 410 denotes a fixing device.

With the arrangement as mentioned above, first of all, the laser beam emitted from the semi-conductor laser 400 is reflected by the polygon mirror to be deflected and then is illuminated on the photosensitive drum 406 through the optical system 403 and the reflection mirror 405 (main scan). In this case, the heading is effected by the photo-detector 404 to determine an illumination position. While one-line main scan is being effected, the photosensitive drum 406 is rotated by an amount corresponding to one-line (sub scan).

The image focussed on the photosensitive drum 406 in this way is developed by the developing device 407 and then is transferred onto the recording sheet P. The recording sheet P is conveyed, along the convey guide 409, to the fixing device 410, where the image is fixed to the recording sheet. Thereafter, the recording sheet is discharged out of the apparatus.

Incidentally, the elements of the sub scan system such as the photosensitive drum 406, developing device 407 and fixing device 410 are driven by the record motor, gears and belts (not shown) in a synchronous manner.

As mentioned above, by intersecting the recording sheet discharge tray with the original sheet supply tray of the facsimile apparatus in the sheet path plane, the space can be saved, thereby making the apparatus more compact.

In the illustrated embodiment, while an example that the image recording portion includes the laser beam printer was explained, so long as a cut sheet is used, other electrophotographic, heat-transfer or ink jet sheet conveying apparatus can be applied to the present invention.

What is claimed is:

1. An image forming apparatus comprising:
   image forming means disposed within a main body to form an image on a recording sheet;
   recording sheet supply means for supplying the recording sheet to said image forming means;
   a stacking portion on which recorded recording sheets are discharged and stacked;
   image reading means for reading an original sheet; and
   original supply means for supplying the original sheet to said image reading means;
   wherein said stacking portion for the recording sheets intersects with a supply path for the original sheet.

2. An image forming apparatus according to claim 1, wherein a recording sheet stacking means for stacking recording sheets on which images are not formed is disposed at a rear part of said main body and a recording sheet stacking means of said stacking portion is disposed at a front part of said main body, and wherein said image forming means is disposed between said recording sheet stacking means for stacking recording sheets on which images are not formed being disposed at the rear part of said main body and said recording sheet stacking means of said stacking portion being disposed at the front part of said main body, and said image reading means is disposed above said image forming means.

3. An image forming apparatus according to claim 1 or 2, further comprising an original sheet tray, said original sheet tray rockable around a rotary shaft extending in a direction perpendicular to an original sheet supplying direction and retractable forwardly of said main body in a used condition and returnable above said image reading means in a non-used condition, and wherein said original sheet tray intersects with said stacking portion.

4. An image forming apparatus according to claim 3, wherein said original sheet tray is foldable.

5. An image forming apparatus according to claim 4, wherein said original sheet tray is provided with an open/close cover disposed at the intersection between said original sheet tray and said stacking portion, and permits passage of the recording sheet on which the image was formed in a condition that said original sheet tray is retracted forwardly of said main body during an original reading operation.

6. An image forming apparatus according to claim 5, wherein said open/close cover is rotated by a drive for said image reading means, and a rotational direction of said drive is opposite to a rotational direction thereof during the original reading operation.

7. An image forming apparatus according to claim 3, further comprising an operation portion for image formation disposed above said image reading means.

8. An image forming apparatus according to claim 2, further comprising a sheet separation and supply means disposed between a lower part of said recording sheet stacking means and said image forming means, and a recording sheet guide disposed at a downstream side of said image forming means in a sheet conveying direction.

9. An image forming apparatus according to claim 8, wherein said recording sheet guide is provided with a switch means for selectively switching a discharge path of said guide to direct the recording sheet to said recording sheet stacking means or toward a front side of said main body.

10. An image forming apparatus according to claim 2, further comprising an original stacking means disposed at a downstream side of said image reading means to stack the original sheets.

11. An image forming apparatus according to claim 2, wherein said recording sheet stacking means of said stacking portion is openable and closeable, and, when said recording sheet stacking means is opened, said image forming means is removeable.

12. An image forming apparatus according to claim 11, wherein, when said image forming means is removed, the sheet convey path is exposed.

13. An image forming apparatus according to claim 1 or 2, wherein said image forming means includes an electrophotographic photosensitive member, exposure means for forming a latent image on said photosensitive member, developing means for developing the latent image to form a developed image, transfer means for transferring the developed image onto the sheet, and fixing means for fixing the transferred image to the sheet.

14. An image forming apparatus according to claim 1, wherein said image reading means includes a supply means for supplying the original sheet, and an image sensor for reading information on the supplied original sheet.

\* \* \* \* \*

UNITED STATES PATENT AND TRADEMARK OFFICE
CERTIFICATE OF CORRECTION

PATENT NO. : 6,178,017 B1
DATED : January 23, 2001
INVENTOR(S) : Yasushi Ishida

It is certified that error appears in the above-identified patent and that said Letters Patent is hereby corrected as shown below:

<u>Column 3,</u>
Line 21, "sheet" should read -- sheets --.
Line 39, "synchronous" should read -- synchronism --.

<u>Column 9,</u>
Line 12, "synchronous" should read -- synchronism --.

Signed and Sealed this

Sixteenth Day of October, 2001

*Attest:*

*Attesting Officer*

NICHOLAS P. GODICI
*Acting Director of the United States Patent and Trademark Office*